United States Patent Office 3,581,362
Patented June 1, 1971

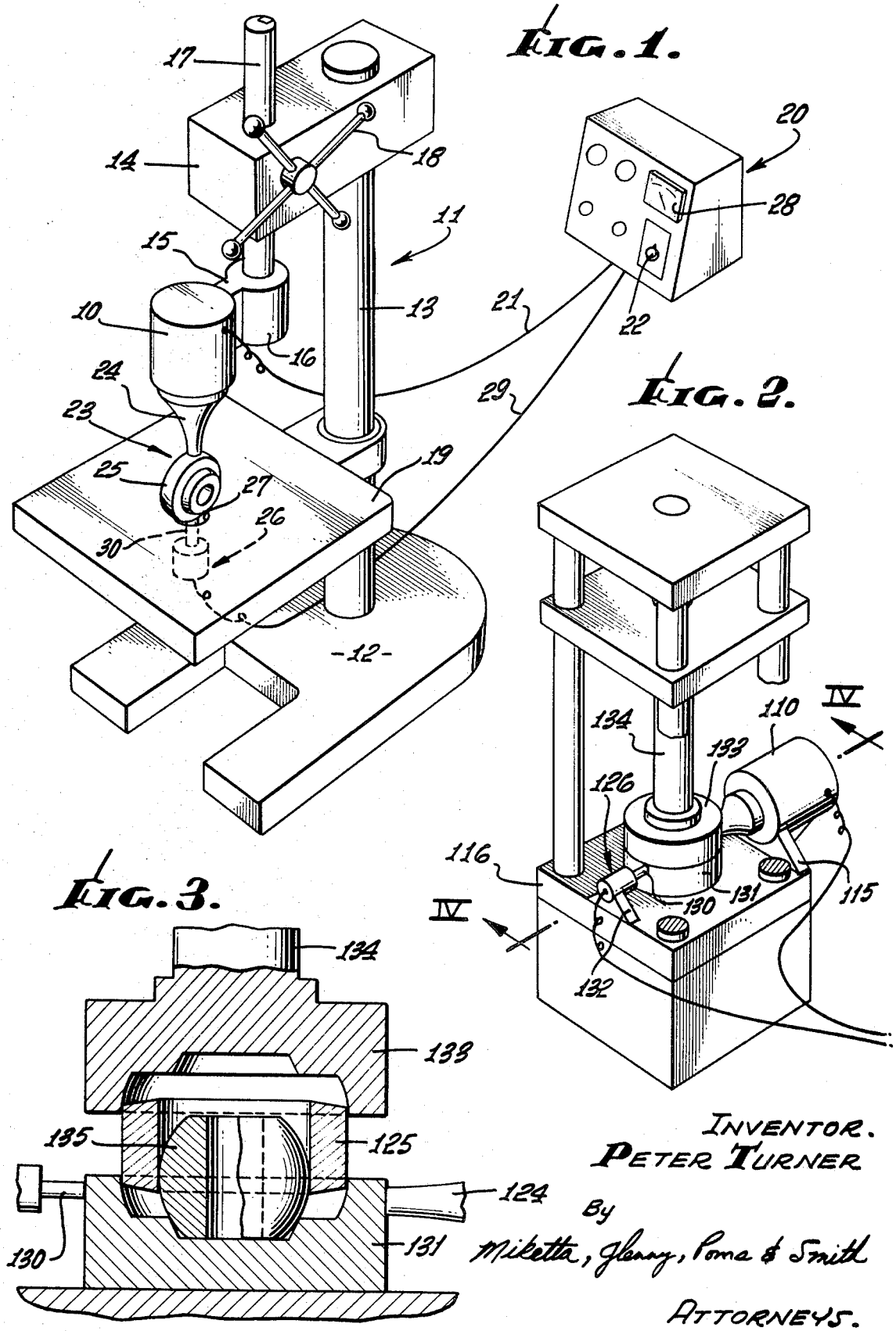

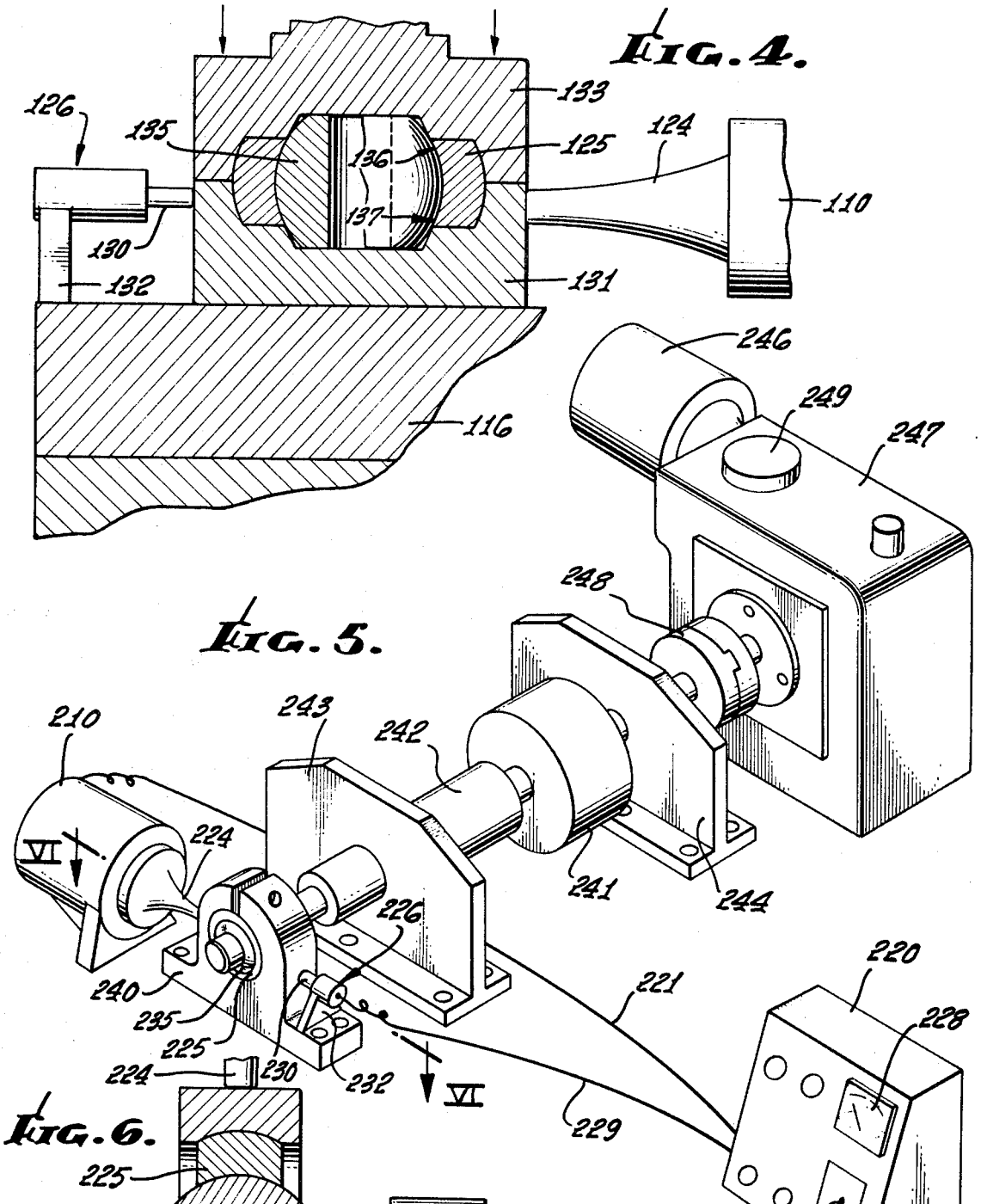

3,581,362
METHOD OF TREATING BEARINGS WITH ULTRASONIC VIBRATIONAL ENERGY
Peter Turner, Granada Hills, Calif., assignor to Kahr Bearing Corporation, Burbank, Calif.
Filed June 12, 1969, Ser. No. 832,582
Int. Cl. B32p 11/00
U.S. Cl. 29—149.5                                    10 Claims

ABSTRACT OF THE DISCLOSURE

Electrical-mechanical vibration transducer means are employed to introduce mechanical vibrations into the race of a swaged spherical bearing to stabilize the race, reduce swaging forces required, eliminate "spring back" of the race away from the inner bearing member, and to produce a desired preload torque value between the inner and outer bearing members; an accelerometer means is provided for measuring the amplitude of vibrations of the bearing race to determine the resonant frequency of the race or race and associated swaging dies of a swaging press or pillow block of a preload measuring apparatus; and methods and means for applying and terminating the application of variable frequency oscillations to the transducer means.

BACKGROUND OF THE INVENTION

In the forming of spherical bearings, it is customary to swage or form a one-piece cylindrical race member about an inner spherical ball member in swaging or forming dies of a press. Such deformation of the race about the inner ball-like bearing member frequently places medial areas of the race in close, intimate non-rotational contact with the outer spherical surface of the inner bearing member while marginal areas of the race "spring back" away from the spherical surface of the ball member due to the "memory" of the race material as known to those skilled in the bearing art. Heretofore, hammering or rolling operations have been conducted upon the race in order to loosen the medial areas of the race from the ball while further secondary forming operations have been conducted upon the race in order to bring the marginal areas of the race into closer bearing clearance relationship with the inner ball member. Further, internal stresses in the race are created even prior to such forming or swaging operations due to the machining of the race into the desired preformed cylindrical configuration.

Problems have also been encountered into the manufacture of such swaged spherical bearings heretofore in establishing a predetermined value for the rotational torque or "preload" required for rotating the inner bearing member relative to the outer bearing member. The conventional hammering or rolling operations conducted upon a swaged race produce a more or less trial and error reduction of the preload through the stress relief of stresses created in the race. It has been inconvenient heretofore to measure such preload on one apparatus and then, by trial and error, reduce such preloading through separate hammering or rolling operations.

It is therefore the primary object of the present invention to disclose and provide a method for treating bearings, primarily of the spherical swaged bearing type, to relieve the stresses in the race at a controlled, determinable rate without interference with other swaging or preload measuring operations being conducted upon the bearing.

It is an object of the present invention to disclose and provide a method for treating bearings to stabilize the bearing race after preforming and prior to a swaging operation in order to maintain dimensional stability while placed in storage.

It is another object of the present invention to disclose and provide a method for treating bearings during the swaging of the outer bearing member about the inner bearing member to reduce the swaging forces required.

It is another object of the present invention to disclose and provide a method for treating bearings during or subsequent to the swaging or forming of an outer member about an inner member to reduce or eliminate objectional spring back of portions of the outer bearing member relative to the inner bearing member.

It is a still further object of the present invention to disclose and provide a method for treating bearings wherein the outer race member is swaged or formed about an inner bearing member to allow a predetermined controlled loosening of the race member relative to the ball by other than the hammering or rolling of such race member.

It is a still further object of the present invention to disclose and provide a method of treating bearings in order to provide a predetermined value for rotational torque or preload between the inner and outer bearing members while monitoring such torque through otherwise conventional torque measuring cell apparatus.

SUMMARY OF THE INVENTION

Generally stated, the method of treating bearings according to the present invention comprises the steps of placing an ultrasonic transducer means for changing electrical current oscillations into mechanical vibrations in vibration transmitting contact with the race of a bearing and applying such vibrations to the race to relieve internal stresses therein. Such vibrations are preferably applied at the resonant frequency of the bearing race by measuring the amplitude of race vibration by means of an accelerometer and applying vibrations at the frequency which causes the greatest accelerometer voltage output.

More particularly, the method of the present invention contemplates the application of resonant frequency vibrations to the race of a bearing to stabilize the same and relieve internal stresses therein either before or after forming of the race about an inner bearing member. The application of such resonant frequency vibrations according to one form of the invention is accomplished through the swaging dies employed for swaging the race about the ball in order to reduce swaging forces required and to reduce or eliminate the objectionable "spring back" of the race from the inner bearing member upon withdrawal from the swaging dies. According to another form of the invention, such resonant frequency vibrations are induced into the race of the bearing during relative rotation of the bearing members and the monitoring of the preload or rotational torque value between such bearing members and discontinuing the application of such vibrations when a predetermined preload value is attained.

A more detailed and complete understanding of the method for treating bearings in accordance with the present invention, and a recognition of further objects and advantages of the present invention, will be afforded to those skilled in the bearing art from a consideration of the following detailed description of the method of the present invention utilized in association with exemplary apparatus through which the method may be practiced. Reference will be made to the appended sheets of drawings in which:

FIG. 1 is a perspective view of an exemplary set-up of apparatus for practicing a preferred embodiment of the method of treating bearings in accordance with the present invention;

FIG. 2 is a perspective view of an alternative exemplary embodiment of apparatus for practicing an alternative exemplary embodiment of the method of treating bearings according to the present invention;

FIG. 3 is a section view of the apparatus of FIG. 2 showing the swaging dies in open position with a spherical bearing positioned therein prior to swaging of the race about the inner bearing member;

FIG. 4 is a section view of the apparatus of FIG. 2 taken therein along the plane IV–IV showing the swaging of the spherical bearing race about the inner spherical bearing member and the associated apparatus for treating the bearings in accordance with the alternative exemplary embodiment of the method of FIGS. 2 and 3;

FIG. 5 is a second exemplary embodiment of apparatus by which the method of treating bearings in accordance with the present invention may be practiced; and FIG. 6 is a section view of the spherical bearing and associated apparatus of FIG. 5 taken therein along the plane VI–VI.

The method of treating bearings formed by swaging an outer race member about an inner bearing member to accomplish the aforestated objects and advantages of the present invention will now be explained in detail with reference to the exemplary embodiments of apparatus illustrated in the drawings.

Referring first to FIG. 1, an ultrasonic transducer 10 is mounted for vertical movement on a pedestal, indicated generally at 11, similar to that used in drill presses. Ultrasonic transducer 10 is of the type commercially available for converting high frequency electrical oscillations into similar high frequency mechanical vibrations. In order to achieve the mechanical resonant frequency of bearing components, transducer 10 must be capable of producing mechanical vibrations in the ultrasonic frequency range of 20,000 Hz. and up.

The drill press-like pedestal, indicated generally at 11, includes a base 12 mounting the standard or upright post 13 upon which the head block 14 is secured. The transducer 10 is provided with a side flange 15 and associated collar or clamp portion 16 secured to the vertical rack gear or rod 17. As in conventional drill press pedestals, manual operation of the associated handle 18 causes vertical movement of rod 17 and the associated transducer 10 relative to the table 19, also secured to standard 13.

A control panel box, indicated generally at 20, is connected by a cable 21 to the transducer 10 as seen in FIG. 1. A variable frequency oscillator may be provided within the control panel box with a manual control 22 for adjusting the frequency output of the oscillator. The mechanical vibration output of transducer 10 may thereby be varied in known manner by control of the associated variable frequency oscillator. As seen in FIG. 1, a spherical bearing, indicated generally at 23, is shown mounted upon table 19 with the transducer horn or vibrator portion 24 in contact with the bearing race 25. The bearing race 25 may thereby be subjected to mechanical vibration for stress relief of the stresses induced therein during swaging of the race about the ball which occur in normal swaging operations in making spherical bearings.

As further contemplated within the method of the present invention, accelerometer means, indicated generally at 26, are mounted to the underside of table 19 and are placed in contact with bearing race 25 through an aperture 27 provided in table 19. Such accelerometer means may be attached by conventional brackets, not shown, to the underside of table 19. The accelerometer means, indicated generally at 26, is a commercially available product which generates an output voltage proportional to the amplitude of input mechanical vibrations sensed by the accelerometer. A potentiometer and other associated electrical equipment may be included within the panel box, indicated generally at 20, the potentiometer dial face being indicated at 28. Cable 29 is connected between the accelerometer means and the panel box in order to supply electrical current thereto, which operates the accelerometer in known manner to produce a voltage output proportional to mechanical vibration input. A vibration sensing projection or sensor rod 30 is shown in FIG. 1 in contact with the underside of the bearing race 25.

As particularly contemplated within the method of the present invention, a bearing, preferably a swaged spherical bearing, is placed upon the sensor 30 of the accelerometer means projecting upwardly of table 19 through aperture 27 and the transducer 10 is lowered through manipulation of handle 18 to bring the horn or vibration transmitting portion 24 down into contact with the bearing race, the bearing race thus being retained between portion 24 and sensor 30 out of contact with table 19. Electrical current is applied through cable 21 from the panel box, indicated generally at 20, which in turn is connected to a suitable source of electric current, to excite the transducer 10 and induce vibrations directly into bearing race 25. The frequency of such vibrations is varied through manipulation of control knob 22 associated with the aforementioned variable frequency oscillator provided in the panel control box. At the same time, the operator watches the potentiometer dial 28 to determine the highest voltage output of the accelerometer means indicated generally at 26. When the mechanical resonant frequency of the bearing race 25 is reached, the amplitude of the induced vibrations will be increased due to the sympathetic vibrations set up within the race at resonant frequency. The amplitude of vibrations sensed by the accelerometer means will be the greastest at such resonant frequency which, in the case of bearing components, is usually in the ultrasonic range of 20,000 Hz. and up. Thereafter, current is continuously applied to the transducer means 10 at such determined resonance frequency to normalize the stresses previously created in the bearing race due to the inherent reactions therein due to swaging of the race about the ball.

It is also contemplated within the present method that the race alone can be thus treated prior to the swaging operation to relieve any stresses therein due to forming operations and to thus normalize the race for storage prior to the swaging thereof about the inner bearing member.

Referring now to FIGS. 2 through 4, an alternative exemplary apparatus and manner of practicing the method of the present invention will be described. In FIG. 2, a transducer means 110, similar to transducer 10 aforedescribed, is mounted by a flange 115 upon a swaging press table 116. As seen in FIGS. 3 and 4, the horn or vibration inducing nose portion 124 of the transducer means is placed in contact with the lower swaging die 131. An accelerometer means, indicated generally at 126, like accelerometer means 26 aforedescribed, is mounted by flange 132 to table 116 with the sensor 130 in contcat with the lower die 131. The upper die 133 is mounted on press rod 134 for vertical movement relative to the lower die in conventional manner.

As seen in FIG. 3, the bearing race 125 and inner spherical ball-like bearing member 135 are mounted within the cavities of the open die members 131 and 133. A conventional swaging operation is illustrated in FIG. 4, the die 133 having been forced downwardly onto stationary 131 to cause swaging of bearing race 125 about the inner ball 135.

As particularly contemplated within the method of the present invention, the stresses created in the bearing race during such swaging thereof about the inner ball member are relieved through the application of ultrasonic mechanical vibrations at the resonance frequency of the race. Having determined such resonance frequncy through the use of apparatus as explained in connection with FIG. 1, th transducer means 110 may be employed in the manner aforedescribed to induce such resonant frequencies through die 130 into the race 125. The application of such vibrational energy after the swaging operation will cause a relief of the stress created therein due to the swaging operation, while application of such energy during the swaging operation will not only relieve such stresses but allow the swaging of the race about the ball at lower swaging pressures than otherwise attainable. Alternatively, the resonant frequency of the bearing race and dies, as a unit, may be determined during the swaging operation through observing the voltage output of accelerometer means 126 and adjusting the associated variable frequency oscillator to maximize such output. In either approach, the method of the present invention contemplates the application of such high frequency vibrational energy to the bearing race prior to the opening of dies 130 and 133 to prevent the "spring back" of the race away from the inner ball member which occurs on removal of swaged bearings from swaging dies in the methods of making the same heretofore. Such "spring back" occurs in the marginal areas of the race indicated generally at 136 and 137 in FIG. 4. Such "spring back" is objectionable in that it increases the difficulty in obtaining a uniform bearing clearance or tolerance between the race and inner bearing member by merely swaging the race around the ball without further forming or rolling operations on the race.

In addition to the elimination of the undesirable "spring back" phenomenon presently occurring in conventional swaging operations on spherical bearings, the method of treating bearings of the present invention may be employed for accurately providing a predetermined preload between the bearing and race. The torque required to rotate the inner bearing member relative to the race can be measured presently by conventional equipment to determine the "preload" of the bearing. This characteristic is frequently specified in the design of bearing components. However, difficult trial and error techniques are required to produce a desired preload for each bearing after a swaging operation though mechanical rolling or other prior art race loosening procedures. In accordance with the method of the present invention, ultrahigh frequency vibrations are induced into the bearing race, preferably at the race resonance frequency, at the same time the preload is measured in an otherwise conventional torque measuring apparatus.

Referring to FIG. 5, an apparatus is illustrated for measuring the torque required to rotate inner spherical bearing member 235 relative to the outer spherical bearing race member 225 which is held within pillow block 240. A torque measuring cell 241 is illustrated mounted on a drive shaft 242 journaled in standards 243 and 244. The inner bearing member 235 is secured by a press fit on the end 245 of drive shaft 242. Torque measuring cell 241 is a commercially available device comprising essentially a solid steel bar with four or more strain gauges mounted upon it to measure the twist in the bar caused by a loading on end 245, due to friction between bearing members 235 and 245, upon rotation of shaft 242. Such rotation of shaft 242 is imparted by operation of an electric motor 246 operably associated with a gear reduction box 247 which drives shaft 242 through a coupling or clutch member 248. The setting of the gear reduction box internal gears may be varied through manipulation of control knob 249. The apparatus for measuring the preload or frictional load between the bearing members 235 and 225 thus far explained is considered conventional and used in practice heretofore. However, it has been necessary heretofore to remove the bearing from pillow block 240 after each measurement of the preload in order to modify such preloading by either subsequent forming operations or loosening operations conducted on other equipment. As particularly contemplated within the method of the present invention, the preload or frictional load between bearing members 235 and 225 may be varied to a predetermined value while being monitored in the torque measuring apparatus.

In accordance with the method of the present invention, an electro-mechanical vibration transducer means 210, as the aforedescribed transducers 10 and 110, is mounted with the horn or vibration transmitting nose portion 224 in contact with the pillow block 240. The apparatus may be placed upon a suitable support to be maintained in the operable relationship illustrated in FIG. 5. Further, accelerometer means, indicated generally at 226, are provided with the sensor 230 in contact with the opposite side of pillow block 240. In the exemplary embodiment, the accelerometer, being of a construction as aforedescribed with regard to accelerometer means 26 and 126, may be mounted by flange 232 directly upon the pillow block flange as illustrated. As previously described, electrical connections may be provided by cables 221 and 229 between a control panel box 220 and the transducer means 210 and accelerometer means 226 respectively.

As seen in FIG. 6, the spherical bearing race 225 is shown in tight conformity about the inner bearing ball member 235. On removal of spherical bearings from conventional swaging dies, the race I.D. is actually smaller than the inner ball O.D. Consequently, the ball exerts a force against the race which in effect stretches the race until it is large enough to fit over the ball. This stretching induces internal stresses in the race and a friction loading between the two bearing members. In accordance with the method of the present invention, high frequency vibrations may be induced into the race 225 through the pillow block 240 by means of transducer means 210. Such application of ultrasonic vibrational energy relieves the stresses in the race, reducing the preload value between the bearing members. Preferably, in accordance with the method of the present invention, such ultrasonic vibrational energy is applied at the resonance frequency of the bearing race as determined through manipulation of oscillator control 222 while observing the voltage output, indicated on dial 228, of the accelerometer means, indicated generally at 226. According to the preferred practice of the method, the application of such ultrasonic vibrational energy is accomplished during rotation of inner bearing member 235 relative to outer bearing member 225 and the torque value indicated by the associated torque measuring cell is being monitored. When the desired preload value, indicated by the torque cell reading, is achieved, the application of ultrasonic energy through transducer means 210 is discontinued.

As in the foregoing examples, the resonance frequency of mechanical vibrations of the race 225 may be applied through pillow block 240 by the transducer means 210, such resonance frequency for the race having been determined in the manner described with regard to the apparatus of FIG. 1. Alternatively, and as illustrated in FIG. 5, the resonant frequency of the bearing race and surrounding pillow block 240 may be measured as a unit through the mounting of accelerometer means 226 against the pillow block 240. In that event, the resonant frequency of the combination of race and pillow block is applied until the desired preload is obtained.

From the foregoing detailed description of exemplary apparatus and means for practicing the method of the present invention, it can be seen that the foregoing objects and advantages stated for the present invention have been attained. Through the treatment of bearings by the method of the present invention, the stabilization of bearing races may be obtained during storage of preformed races prior to a swaging or forming operation about an inner bearing member. The internal stresses created in such spherical bearing races due to the forming or swaging operations can be relieved according to the methods of the present invention to provide a predetermined preload value, to lower swaging forces required during swaging of the race about the ball and/or to reduce or eliminate objectionable "spring back" of the race from about the ball. It should also be apparent to those skilled in the art that various modifications, variations and adaptations of the method of the present invention, as well as its utilization with apparatus other than that illustrated in the

I claim:
1. A method of treating bearings formed by swaging an outer race member about an inner bearing member comprising the steps of:
   placing an ultrasonic transducer means for changing electrical current oscillations into mechanical vibrations in vibration transmitting contact with the race of a swaged bearing;
   placing an accelerometer means for producing an output voltage proportioned to induced vibration amplitude in vibration sensing contact with the race of said bearing;
   applying electrical current of varying oscillatory frequencies to said transducer means to determine the resonance frequency of the bearing race indicated by the largest corresponding voltage output of said accelerometer; and
   thereafter continuing to apply said current to said transducer means at a current frequency generally equal to the bearing race resonance frequency to normalize stresses in said race.

2. A method of treating bearings as in claim 1 wherein:
   said step of applying current to said transducer means at a current frequency generally equal to the determined resonance frequency is performed concurrently with the step of swaging the race about the inner bearing member.

3. A method of treating bearings as in claim 1 to provide a desired preloading between the inner bearing and the outer race member wherein said step of applying current to said transducer means at a current frequency generally equal to the bearing resonance frequency is performed concurrently with the additional steps of rotating said inner bearing member relative to said outer race; and including the additional steps of:
   measuring the torque load required to rotate said inner bearing member relative to said race; and
   discontinuing the application of current to said transducer when the value of said torque load is reduced to a predetermined amount to provide a desired preloading of said inner bearing member relative to said race.

4. A method of treating bearings formed by swaging an outer race member about an inner bearing member comprising:
   inducing vibrations into the race of the bearing by means of an ultrasonic transducer means placed in vibration transmitting association therewith to relieve stress created in said race member due to the swaging of said race about said inner bearing member.

5. A method of treating bearings as in claim 4 wherein:
   said step of inducing vibrations into the race of the bearing includes the step of placing the transducer means in direct contact with the race of the bearing.

6. A method of treating bearings as in claim 4 wherein:
   said step of inducing vibrations into the race of the bearing includes the step of placing the transducer means in direct contact with a swaging die in which said race member is swaged about said inner bearing member.

7. A method of treating bearings as in claim 4 with the added steps of:
   measuring the amplitude of vibrations of the race member of the bearing while varying the frequency of the induced vibrations to determine the resonance frequency of said race member; and thereafter
   inducing vibrations into the race of the bearing at such determined resonance frequency.

8. A method of treating bearings as in claim 7 wherein:
   said step of measuring the amplitude of vibrations of the race member of the bearing includes the placing of an accelerometer means for producing an output voltage proportional to induced vibration amplitude in vibration sensing relation to said race member and determining the resonance frequency of said race member at which the voltage output of said accelerometer means is the maximum.

9. A method of treating bearings as in claim 4 with the added steps of:
   producing relative rotation between the inner bearing member and the outer race member;
   monitoring the amount of torque required to produce such rotation; and
   discontinuing the step inducing vibrations into said race member when a predetermined torque value is achieved.

10. A method of treating bearings as in claim 9 wherein:
    said steps of producing relative rotation and monitoring the amount of torque are performed concurrently with said step of inducing vibrations into said race member.

References Cited
UNITED STATES PATENTS

| | | | |
|---|---|---|---|
| 2,252,351 | 8/1941 | Paulus | 29—149.5 |
| 2,476,728 | 7/1949 | Heim | 29—149.5 |
| 3,323,340 | 6/1967 | Bitzer, Jr. | 72—135 |

THOMAS H. EAGER, Primary Examiner

U.S. Cl. X.R.

29—441